MAGNETIC RECORDING AND REPRODUCING APPARATUS AND METHODS FOR SIMULTANEOUSLY REPRODUCING SEPARATE INFORMATION

Filed Jan. 24, 1966 4 Sheets-Sheet 1

INVENTOR
Kenneth D. Stephens, Jr.
BY Lynn G. Foster
ATTORNEY

INVENTOR
Kenneth D. Stephens, Jr.
BY Lynn G. Foster
ATTORNEY

INVENTOR
Kenneth D. Stephens, Jr.
BY Lynn G Foster
ATTORNEY

INVENTOR
Kenneth D. Stephens, Jr.
BY
Lynn G. Foster
ATTORNEY

United States Patent Office 3,539,712
Patented Nov. 10, 1970

3,539,712 MAGNETIC RECORDING AND REPRODUCING APPARATUS AND METHODS FOR SIMULTANEOUSLY REPRODUCING SEPARATE INFORMATION

Kenneth D. Stephens, Jr., Salt Lake City, Utah, assignor, by mesne assignments, to Electronic Research Corp., Salt Lake City, Utah, a corporation of Utah Filed Jan. 24, 1966, Ser. No. 522,623
Int. Cl. H04n 9/32, 5/78; G11b 5/52
U.S. Cl. 178—5.4 32 Claims

ABSTRACT OF THE DISCLOSURE

Disclosed herein are several methods and devices, including particular magnetic head configurations, for recording and reproducing high frequency signals, such as video, on a magnetic medium. Additional reproducing heads arranged in a predetermined spaced relationship with respect to conventional magnetic transducers are employed in different ways to enable the recording and playback of information. Delayed signals may be provided for extending the duty cycle of individual sequential color signals for enhancement thereof. In one embodiment a video recording mechanism includes a pair of conventional magnetic transducers spaced apart 180° and mounted in the same plane. An additional pair of similar heads is stacked above the conventional heads by a distance equal to one magnetic track width of recorded information. Other arrangements are disclosed wherein the spacing of the sets of heads are different from one track width or offset from one another. Electronic circuits for use with such head configurations for providing various recording and playback functions are disclosed.

This invention relates to the recording and/or reproducing of high frequency signals, and more particularly to a system, including method and apparatus, for recording and reproducing of video on a magnetic tape.

In video tape recorders of the prior art, no known attempt has been made to utilize an "on-tape delay" technique as described in this specification to obtain the advantages listed below.

In accordance with this invention there is provided a novel system, including method and apparatus, for recording periodic video signals in substantially parallel tracks on a recording medium. On playback, the present system accommodates concurrent scanning of separate recorded tracks using a plurality of reproducing heads which are disposed in such a manner as to continuously present two or more heads to said recording medium at any point intime, each head reproducing one separate though substantially parallel track, with one head providing an on-tape output delayed by a certain interval of time relative to another. This on-tape delay is useful in: (a) achieving elimination of disturbances in the reproduced picture pertaining to a given source by substituting the delayed video for the normal video where the normal video is defective; (b) accommodating high quality multi-channel programming by reproduction of video derived from separate sources; (c) producing high quality sequential color by extending the duty cycle, i.e. increasing the ratio of "on" time to "off" time for each color channel.

In this way a number of important advantages, not obtainable using the prior art, are achieved by the present invention in its various embodiments.

One primary object of this invention is the novel elimination of noise and dropouts in the reproduced image signal.

Another significant object of the present invention, unique with respect to the prior art, is high quality multichannel programming effectively multiplying information storage capabilities on a given length of magnetic tape and video reproduction equipment, with several separate output channels being simultaneously reproducible. Multiangle and three-dimensional viewing is also attainable.

Still another important object of this invention relates to duty cycle extension for sequentially codified information, as, for example, in 60-cycle field sequential color video reproduction.

One further significant object of this invention is the provision of a method of and an apparatus for achieving all of the above advantages while retaining compatibility with conventional recorders.

These and other objects and features of this invention will become more fully apparent from the ensuing description and appended claims taken in conjunction with the accompanying drawings wherein:

FIGS. 1–4, inclusive, schematically represent a typical state-of-the-art video recorder. FIG. 1 and FIG. 2 portray the scanning head configuration in perspective and in plan, respectively. FIG. 3 schematically displays the recorded pattern developed on the magnetic tape in this configuration. Lastly, FIG. 4 is a block diagram representative of signal flow emanating from said configuration;

FIGS. 5–8, inclusive, depict a novel embodiment which may be utilized in accordance with the present invention. FIGS. 5 and 6 illustrate plan and edge views, respectively, of one presently preferred scanning disc assembly, while FIGS. 7 and 8 represent block diagrams of signal flow for two methods of utilization of such a scanning disc assembly.

FIGS. 9 and 10 each schematically represent a block diagram of signal flow in another method of utilization of the scanning disc configuration depicted in FIGS. 5 and 6.

FIG. 11 diagrammatically represents in block, signal flow in still another method of utilization of the configuration illustrated in FIGS. 5 and 6.

FIGS. 12–15, inclusive, depict another novel embodiment of this invention. FIGS. 12 and 13 are a plan and an edge perspective view, respectively, of another scanning disc assembly configuration. FIG. 14 represents a recorded pattern developed by this configuration, while FIG. 15 represents a recorded pattern developed by this configuration.

FIGS. 16 and 17 show a plan and an edge perspective view of still another scanning disc configuration;

FIGS. 18–20, inclusive, illustrate still another presently preferred embodiment of this invention. FIGS. 18 and 19 are a plan and an edge perspective view, respectively, of the scanning disc configuration of this embodiment, while FIG. 20 represents a recorded pattern developed by this configuration;

FIGS. 21–24, inclusive, represent still a further embodiment according to the present invention. FIG. 21 is a perspective representation, FIGS. 22 and 23 are two edge views, and FIG. 24 represents a recorded pattern developed by this configuration;

FIGS. 25–28, inclusive, represent, in schematic perspective, various scanning head hookups, each having certain advantages; and FIG. 29 is a block diagram of a presently preferred head hookup switching arrangement.

PRIOR ART

Briefly, in the state-of-the-art recorder schematically depicted in FIGS. 1–4, a length of magnetic tape 4 is arranged to be advanced in a helical configuration around head drum cylinder, generally designated 1. The tape 4 is positioned by two tape guides 5 so as to successively present the tape surface to first one and then the other of two rotating heads 6 and 7 mounted on scanning disc 2 (which disc is exaggerated in the vertical throughout the drawings of this specification). This produces a recorded pattern in the form of parallel tracks 12*a*, 12*b*, 12*c*, etc., recorded by heads 6 and 7 diagonal to the length of the tape. Generally, the scanning disc rotates in a direction substantially opposite to the movement of the tape. Although a 180° scan two-head configuration is shown, other configurations such as 360° scan have also been employed in the past. In the recording of video, as is well known in the art, even and odd field vertical intervals 14*a*, 14*c*, etc. and 14*b*, 14*d*, etc. respectively, are laid down at each edge of the designated scanned tape area 10 such that head switch-over takes place during these intervals, often during the "back porch" of the vertical blanking interval.

In general block form, illustrated in FIG. 4, state-of-the-art recorders have consisted of a signal modulator system 16 wherein the incoming video-frequency modulates a radio frequency carrier, the resultant of which feeds the scanning heads 6 and 7 which magnetically impregnate a passing tape 4, using scanning system 17. During playback, the previously recorded signals carried by the tape 4 are scanned by the heads 6 and 7, the signal paths of which may mechanically overlap making electronic switching desirable, through preamplifier 11 and signal demodulator system 18 where the original modulating signal is recovered.

EMBODIMENT OF FIGS. 5–8

In accordance with the present invention, FIGS. 5 and 6 illustrate a novel head configuration for achieving "on-tape delay," as will become more fully apparent as the description proceeds.

This embodiment comprises use of a pair of conventional heads 6 and 7 positioned as are the heads of FIGS. 1 and 2, and a pair of heads 60 and 70 which are mounted on the scanning disc 2 so that their gap centers are horizontally aligned but vertically spaced by substantially one track width *w* from heads 6 and 7, respectively, so as to be concerned with information one track removed from the position of the track concerning normal heads 6 and 7.

Thus, by use of the configuration of FIGS. 5 and 6, dropout and noise elimination can be achieved in at least two ways, e.g. illustrated in block diagram in FIGS. 7 and 8.

Specifically, in the record mode, only the normal set of scanning heads 6 and 7 (or, alternatively, the heads 60 and 70) is activated, and recording of the incoming video from a single source proceeds in the conventional way. Thus, the first conventional head 6 lays the diagonal track 12*a* (FIG. 3) on the magnetic tape corresponding with the first incoming video field, for example, the even field. When head 6 has passed through an angle of approximately 180°, contact with the tape is lost, and the second conventional head 7 is in position to record the track 12*b* (FIG. 3) directly adjacent to the first track 12*a*, and corresponding with the second incoming video field, this time the odd field. It can be seen that, in this mode of operation, the present embodiment is completely compatible with conventional state-of-the-art devices, whereby conventional uses are easily accommodated and in many cases allowing recorded tape interchangeability with such recorders. This recording process is repeated for the entire length of the programming, alternate tracks being serially recorded by alternate heads as the heads are brought into registry with the tape. Thus, at this point in time, the full information originating from a single video source will have been recorded successively upon the diagonal tracks of the tape in $1/60$ second segments.

However, in the playback mode of operation, normal heads 6 and 7 are directly coupled through scanning system 40 by suitable means (see FIGS. 25–28) to conventional preamplifier 11. Moreover, additional heads 60 and 70 are likewise coupled into a duplicate preamplifier 13 during playback.

Now, since additional heads 60 and 70 are mounted such as to be brought into registry with the tape one track width behind normal heads 6 and 7 relative to the direction of tape motion, the resultant signal output from the preamplifier 13 (fed by heads 60 and 70) will be delayed by $1/60$ second with respect to the signal output of the preamplifier 11. This corresponds to the time interval of one video field, and, thus, the two signals will be precisely in synchronism at the two preamplifier outputs. This precise synchronism is very important with respect to not only dropout elimination but also relative to color television as will become more fully apparent subsequently. This phenomenon is one example of "on-tape" utilization according to the present invention. As a consequence, one normal head, e.g. head 6, passes across a given track $1/60$ second before the additional head, e.g. head 70, becomes concerned with the same track.

Several methods of dropout elimination can be achieved by use of the described embodiment. FIG. 7 schematically depicts one such method, wherein gate 34 is arranged so as to normally pass the dropout R.F. signal from the normal preamplifier 11. However, in the case the output from this preamplifier is defective such as during a dropout, gate 34 instantaneously selects or switches to the output of the other preamplifier 13 for the duration of the disturbance. One suitable gate, well known in the art, is a simple high-speed diode switch, which normally uses a number of diodes corresponding to each input source. The output of gate 34, whether from a preamplifier 11 or 13, always feeds the conventional demodulator system 18 which thereby produces substantially dropout-free video.

In FIG. 8 a similar sequence is followed with respect to that depicted in FIG. 7 and above described. The two outputs from preamplifiers 11 and 13, however, feed two separate demodulator components, 18 and 19, respectively. The two video signals from said demodulators, as a result, are fed into a gate 36, which is similar to gate 34, the gate normally passing the signal from demodulator 18. Whenever a disturbance occurs in the signal from the demodulator, however, switching means of suitable type are provided to instantaneously pass the signal from the duplictae demodulator 19. Hence, the resultant output is freed from dropout and noise disturbances. Thus, when the normal output signal carries a blemish (e.g. "noise," "dropout," etc.) the delay signal is substituted for the duration of the disturbance and, for example, the television viewer in the absence of other intervening circumstances, will witness a substantially disturbance-free picture.

EMBODIMENTS OF FIGURES 9 AND 10

FIGS. 9 and 10 represent in block form two methods of achieving another utilization of the head configuration shown in FIGS. 5 and 6, i.e. multi-channel programming.

With reference to FIG. 9, when in the record mode, only the normal set of scanning heads 6 and 7 (or alternatively heads 60 and 70) is activated, and recording from two or more incoming video sources is accomplished by means of a suitable alternator 20 of some known type which switches between the heads 6 and 7 at a certain rate, for example, at 60 cycles per second. The alternator output is serially fed into the conventional signal modulator system 16 and a scanning system 41, such that alternate tracks on the tape contain recorded information received from separate sources. For example, alternate tracks, 12*a*, 12*c*, 12*e*, etc., (FIG. 3) will record information from only one of two input sources, for example, Video One, while the interleavened parallel tracks 12*b*, 12*d*, 12*f*, etc., solely records information from the second Video Two source.

During playback, both the normal heads 6 and 7 and the additional heads 60 and 70 are activated, heads 6 and 70 being suitably coupled into one preamplifier 11 and heads 7 and 60 being appropriately coupled into a second separate preamplifier 13.

Dual programming is readily achieved using this embodiment of the present invention since heads 6 and 70 are concerned only with the information found on alternate tracks, for instance Video One, and heads 7 and 60 are concerned only with the information found on the interleavened tracks, in this case Video Two. Now, since heads 60 and 70 are mounted such as to be offset from heads 6 and 7 by one track width *w*, the resultant output signal segment from head 70 will serially comprise a reproduction of the same segment reproduced 1/60 second earlier by head 6. Likewise, the output signal segment from head 60 will serially comprise a reproduction of the same segment reproduced 1/60 second earlier by head 7. Thus, the information from video source One is coupled into preamplifier 11 in the following field sequence; 1, 1, 3, 3, 5, 5, etc., and the information from video source Two is coupled into preamplifier 13 in the complementary sequence; 2, 2, 4, 4, 6, 6, etc.

Each preamplifier 11 and 13 feeds a separate demodulator, i.e. units 18 and 19, and their resultant separate video outputs constitute the essence of the mentioned multichannel programming.

FIG. 10 depicts another multi-channel configuration wherein the input alternator 20 operates at video frame rate, usually 30 cycles per second, and, consequently, yields an on-tape recorded pattern containing two adjacent tracks of Video One information, comprising a 1/30 second frame which includes two fields, followed by two adjacent tracks of Video Two information, also comprising a 1/30 second frame.

The head configuration and operation during the record mode are similar to that described in conjunction with FIG. 9, i.e. only one set of heads located in the same horizontal plane are used, either, heads 6 and 7 or heads 60 and 70, the distance between the horizontal planes occupied by the head sets being equal to an amount $2w$. The distance $2w$ accommodates multi-channel playback incorporating the "on tape delay" principle of reproducing the recorded pattern, which pattern comprises two adjacent tracks of video one information followed by two adjacent tracks of video two information.

During playback, all heads are activated and the outputs from normal heads 6 and 7 are coupled into one preamplifier 11, and the outputs from additional heads 60 and 70 being likewise coupled into a separate preamplifier 13. Hence, two separate demodulators, 18 and 19, respectively, are separately fed and the separate outputs are coupled into individual inputs of a 30-cycle changeover alternator 32.

Video One is first received as fields comprising a given frame from heads 6 and 7. The same frame is immediately thereafter received from heads 60 and 70. While Video One is being received in the mentioned "delayed" frame from heads 60 and 70, Video Two is being received in the following frame from the next two adjoining tracks through heads 6 and 7. During the following 1/30 of a second, Video Two receives a delayed signal for the last mentioned frame. Since the output from each head set directly represents all of the on-tape information content, the signal from the set comprising heads 60 and 70 lags the signal from the normal set comprising heads 6 and 7 by 1/30 second. Hence, means such as the mentioned changeover alternator must be employed to direct the signal from each set at a certain interval, such as 1/30 second, into the proper output channel.

Thus, the duty cycle is extended. Duty cycle as used in this specification means the ratio of "on" time to "off" time of recorded information with respect to a given channel during playback.

As a result, the full nominal 525 horizontal scan lines are used, whereby maximum picture resolution potential is realized for each channel.

The changeover alternator 32 or the like might be located elsewhere in the system, as for instance, between head sets and preamplifiers or between preamplifiers and demodulators, so as to switch video, as shown, or to switch R.F., as the situation requires.

Besides pertaining to applications involving multiprogramming of separate and unrelated source materials, this concept is applicable as well to matters in some way related in time and/or space. One such use is in the achievement of simultaneous multi-angle viewing, as in surveillance applications, accomplished simply by directing video from a camera at each of two or more separate vantage points into the separate multi-channel inputs.

By the same token, if the views conveyed by these video sources comprise two angles representative of three-dimensional reproduction, these signals can in like manner be processed through the separate multi-channel recorder inputs. At playback, three-dimensional reproduction equipment of suitable known type is employed. One method known in the art utilizes superimposed television images from two separate monitors which receive "right" and "left" channel information respectively. Each monitor faceplate contains a transmission type light polarizing material the plane of which is at right angles to the other. In this manner, "left" and "right" channel information can be directed to the proper eye of a viewer wearing eye glasses correspondingly polarized who will consequently witness a three-dimensional image.

EMBODIMENT OF FIG. 11

FIG. 11 is represents, in block form, one way to achieve still another method of utilization of the configuration of FIGS. 5 and 6, i.e. for duty cycle extension of sequential information as in field sequential color reproduction.

In the record mode, only the normal set of scanning heads 6 and 7, or alternatively, heads 60 and 70, is activated, and recording of the sequential information proceeds in a manner as earlier described. Hence, the first head 6 lays a diagonal track 12*a* on the magnetic tape corresponding, for example, to a red even field of video. This track is followed by another 12*b*, laid on by the dihedral head 7, and corresponding to a blue odd field of video. The following track 12*c* is laid down by head 6, and this time corresponds to a green even field, followed by a track 12*d* from head 7 for a red odd field, a track 12*e* from head 6 for a blue even field, and a track 12*f* from head 7 for a green odd field. At this point, head 6 is ready to record a track corresponding to a red even field, and thereafter the record cycle proceeds as set forth in the table below.

The playback mode proceeds as indicated by the block diagram FIG. 11, which is in part similar to the block diagram of FIG. 8, (which pertains to dropout elimination). All four heads are activated and connected such as to pass the normal signal train through one preamplifier 11 and demodulator 18 and a signal train in substantially perfect synchronism but delayed by one field (1/60 second) through a second preamplifier 13 and demodulator 19.

At this point, the video output from the normal demodulator 18 is sampled by suitable means such as a gating waveform generator 21, which detects a color coded trigger signal of the suitable form from which it develops and supplies switching signals to red/blue/green gate systems. The first gate 22 is fed by video from the normal demodulator 18, and the second gate 24 is fed by the duplicate demodulator 19 so that each discriminates between red, blue and green fields, and channels each color field to a separate output. Of course, other colors or hues could be used, if desired.

The corresponding red, blue, and green outputs from each gate system are now mixed in red, blue, and green mixers, 26, 28 and 30 respectively.

The output of each of these mixers corresponds to one of the three color field trains, but with a "normal" and a "delayed" field in series so as to extend the duty cycle of each color during playback as indicated by the following table:

| | Time sequence, sec. | | | | | |
|---|---|---|---|---|---|---|
| Color sequence | 1/60, even field | 1/60, odd field | 1/60, even field | 1/60, odd field | 1/60, even field | 1/60, odd field |
| Record: | | | | | | |
| Red | Head 6 | | | Head 7 | | |
| Blue | | Head 7 | | | Head 6 | |
| Green | | | Head 6 | | | Head 7. |
| Playback: | | | | | | |
| Red | Head 6 [1] | Head 70 [2] | | Head 7 [1] | Head 60 [2] | |
| Blue | | Head 7 [1] | Head 60 [2] | | Head 6 [1] | Head 70. [2] |
| Green | Head 60 [2] | | Head 6 [1] | Head 70 [2] | | Head 7. [1] |

[1] Normal.
[2] Delayed.

Hence, the field sequential duty cycle, which is only ⅓ using the prior art, is extended to ⅔ by the present invention because each train of information is played twice, one during normal playback and once during delayed playback.

The chief advantage in the described duty cycle extension is improved quality in the resultant image. Specifically, the problem of "flicker," normal apparnet in 60 cycle sequential video systems, is substantially overcome. At the same time, the embodiment of FIG. 11 yields twice the effective light output and saturation per color channel at the receiver. This configuration can be adapted for duty-cycle extension of other sequential information, such as line sequential color.

EMBODIMENT OF FIGS 12–15

FIGS. 12 and 13 depict another head configuration wherein one normal head 6 is spaced 180° from a head 70, head 70 being stacked vertically above the flush position of head 6 by approximately one track width $w$. The normal head 6 is mounted directly adajacent an additional head 80 likewise stacked above the scanning disc by approximately one track width $w$. In this situation the actual stacked distance is $w(\theta/180°)w$, where $\theta$=the horizontal angle between adjacent normal and delay heads in degrees. Head 80 is spaced 180° from a fourth head 9, which head 9 is mounted flush on the scanning disc.

This configuration may be utilized to realize all of the aforementioned "objects" of the present invention, being used compatibly with conventional television equipment with the exception of recorded tape interchangability with the conventional state-of-the-art recorders which it does not exhibit.

FIG. 14 represents the recorded pattern which is obtained by the head configuration of FIGS. 12 and 13 when two incoming video sources are recorded alternately by field, first by one head 6 (e.g. even field) and then by a combination of the additional heads in a given order, such as heads 80 and 9, for a greater and lesser period of time totalling the odd video field period. FIG. 15 relates this recorded pattern to the recording of field sequential color video (for instance red/blue/green). In each, as shown in FIGS. 14 and 15, vertical interval periods 14$a$, 14$b$, 14$c$, etc. are alternately staggered. Those interval periods pertaining to one field (odd in the example) are inherently spaced from one video track recording edge 10 by a distance corresponding to the horizontal spacing between adjacent head pairs 6 and 80, 70 and 9.

In one mode of operation using the configuration represented by FIGS. 12 to 15, information is recorded by either head 6 or head 9 or the two in parallel, a suitable switch being provided for selection of record mode. One suitable switch is depicted in FIG. 29 and description subsequently in text.

For such an embodiment, horizontal gap spacing between adjacent head pairs 6 and 80, 70 and 9, respectively, is critical. Preferably this spacing should not exceed on the order of the smallest whole multiple of a distance $h$, where $h$ equals distance on tape between horizontal information intervals. The distance $h$ is approximately .041" for the recorder presently being utilized for test purposes. On this recorder, for example, the smallest proper horizontal head spacing possible is .287", resulting in a $7h$ time interval between the heads. Since the time interval of vertical synchronism "back porch" is 9 to $11h$, head switching for each pair of heads may be made to take place during this vertical pulse period. This is advantageous in that no interference with actual picture content can result, switching transients and instabilities all taking place during the vertical blanking period during which the television receiver is blacked out.

A further advantage of such minimal adjacent head spacing pertains to the recording of codified information as in three-dimensional and/or field sequential color television reproduction. Referring to FIGS. 12 through 15, it is to be noted that while head 6 is in contact with the last portion of a given track, head 9 comes into contact with the following track, and for an interval of time corresponding to the adjacent head horizontal distance previously referred to, is in contact with the tape surface simultaneously with head 6. If the two heads are being fed record information in parallel, it can be seen that this first interval period $\mathbf{12}b_2$, $\mathbf{12}d_2$, etc., recorded by head 9 will consist of the same information as for a comparable period at the end of tracks 12$a$, 12$c$, etc.

If the recorded information consists only of synchronizing pulses, however, head 80 will scan this information when tape contact with head 9 is lost, discerning no difference between the actual vertical interval and that which would be present in the preferred configuration in which adjacent head horizontal spacing equals zero. Therefore, no color or other codified-signal contamination will result in the interval of simultaneous head contact.

EMBODIMENT OF FIGS. 16 AND 17

In FIGS. 16 and 17 there is shown still another head configuration involving a normal set of heads 6 and 7 disposed at substantially the same horizontal elevations (normally flush with the top of the scanning disc) and spaced 180° apart. Directly adjacent to each head 6 and 7, respectively, is one of two additional heads, 80 and 90, each disposed at substantially the same horizontal elevation as the other and spaced 180° apart. Each of the additional heads 80 and 90 is stacked above the heads 6 and 7 by distance $[w-(\theta/180°)w]$. Thus, the heads 80 and 90 are concerned with information one track removed from that of the normal heads at any given point in time.

This configuration is best utilized for applications wherein alternate track information channels needn't be in precise synchronism, as, for example, in multi-channel programming of separate and unrelated information channels. As is true of the configuration depicted in FIGS. 5 and 6, the embodiment of FIGS. 16 and 17 offers the advantage of complete interchangeability with state-of-the-art recorders through utilization of either set of heads for conventional recording and playback. In this function, as in other "compatible" configurations, such as that represented by FIGS. 21–24, means could be easily employed to switch from one to the other set of heads in the event of clogging, etc. Furthermore, an unmodified conventional recorder could be used to record two video sources on a single magnetic tape using an alternator. The tape could then be placed on a recorder conforming to the present invention for full dual channel playback, thus, effectively increasing the efficiency of many operations employing conventional recorders while decreasing the capital outlay necessary to achieve the objects ennumerated.

EMBODIMENT OF FIGS. 18–20

FIGS. 18 and 19 represent still another scanning disc configuration, and while FIG. 20 illustrates the resultant recorded tape pattern. Here, normal head 6 is spaced 180° from a head 100, which head is placed below the head 6 on the disc by a distance $[w-(\theta/180°)w]$. This distance is approximately equal to the width of one track. The two heads 6 and 100 are, respectively, positioned directly horizontally adjacent two additional heads 80 and 9. The head 80 is mounted above the head 6 by distance $[w-(\theta/180°)w]$, and the remaining head 9 is mounted at substantially the same horizontal elevation as is head 6.

The recorded pattern of FIG. 20 is produced by the head configuration of FIGS. 18 and 19 when alternate video frames ($\frac{1}{30}$ second) are fed in timed relation to heads 6, 100, 80, and 9, respectively, each head being operative for a $\frac{1}{60}$ second (field) period. The Video One even field is thus recorded by head 6 on track 12*a*, and the Video One add field by relatively low head 100 on track 12*b*. However, because of the relative vertical positions of these two heads, the recorded tracks are spaced apart by one extra track width *w* relative to a conventionally scanned tape.

Hence, the Video Two even field is next fed to head 80 which lays down track 12*c* between the former two tracks 12*a* and 12*b* because of its relatively high vertical position. This is followed by the Video Two odd field which is placed by head 9 on track 12*d* in the normal (fourth) position on the tape. Thus, the relative positions of the tracks 12*b* and 12*c* are effectively inverted due to the vertical relations of the head pairs.

The tape so recorded, using the head configuration of FIGS. 18 and 19, may be replayed on a recorder employing one of several previously mentioned scanning disc configurations, including the present embodiment and the embodiment shown in FIGS. 12–15. However, tapes recorded thereby are not interchangable with conventional state-of-the-art cinfiguration recordings. When utilized for dual channel programming, tapes recorded in this manner retain and permit reproduction of the full 525 horizontal line resolution contained in each video frame for each channel. This is materially advantageous over 60 cycle alternation, wherein the 262½ horizontal line response gives rise to picture graininess and line patterning. At the same time, due to the on-tape field order for each channel, which has an averaging effect on time between intervals of a given channel, the present embodiment overcomes to a large extent the problems of flicker, edge breakup, etc., normally associated with 30 cycle alternation.

EMBODIMENT OF FIGURES 21–24

FIGS. 21–23 depict still another scanning disc configuration and FIG. 24 the resultant recorded tape pattern. Here a normal head 6 has spaced vertically above it, substantially by distance *w*, a second head 60. The heads 6 and 60 have a coincident line of gap centers (i.e. where $\theta$ is zero, with the gap centers of adjacent heads vertically aligned) perpendicular to the plane of the scanning disc, and are placed 180° from a second pair of heads 7 and 100. Head 7 is in the normal position and the second head 100 is spaced below it by substantially the distance *w*, said pair of heads having coincident line of gap centers perpendicular to the plane of the scanning disc.

FIG. 24 depicts the recorded pattern created upon the magnetic tape by this configuration when alternate video frames ($\frac{1}{30}$ second) are fed in timed relation to heads 6, 100, 60 and 7, respectively, each head being operative for a $\frac{1}{60}$ second (field) period. Thus, the Video One even field is recorded by head 6 on track 12*a*, and the Video One odd field by relatively low head 100 on track 12*b*. However, because of their relative vertical positions, these two heads lay tracks spaced apart the width *w* of an extra track. The Video Two even field is next fed to head 60, which, because of its relatively high position, lays track 12*c* between the former two tracks. This is followed by the Video Two odd field which is placed by head 7 on track 12*d* in the normal (fourth) position on the tape.

The tape thus recorded may be replayed on a recorder employing one of several previously mentioned scanning disc configurations, including the present embodiment and the embodiment represented in FIGS. 5–8. This embodiment offers the same advantages as those set forth above with respect to the embodiment of FIGS. 18–20. An additional advantage exists over and above those attributed to the embodiment of FIGS. 18–20, as the present system has the capacity to record and playback tapes interchangeably with conventional recorders.

FIGURES 25–28

FIGS. 25–28 are perspective views of four separate electronic scanning head hookups, each particularly suited to achieve certain advantages. All four hookups are available for any scanning disc mechanical configuration. In this case the head configuration represented in FIGS. 5–8 is illustrated and described. Preferably any one of the four hookups may be selected for use by suitable means, as for example, a rotary switch. In FIGS. 25–28, N.C. means that the designated lead has no electrical connection to the preamplifier. Roman numeral I in all cases refers to the suitable selectively settable electronics to which the head leads thereof may be electrically connected, as desired. Thus, the head sets are selectable between poistions across the outputs of the modulator 16 and the inputs (e.g. 11*a* and 11*b* of FIG. 29) of the normal preamplifier 11, said preamplifier embodying electronic switching means (e.g. 11*c* of FIG. 29) to a single output.

Roman numeral II in all cases refers to electronics over and above those found in conventional recorders, and to which the heads thereof operate as set forth subsequently. These added electronics necessarily include a preamplifier 13 similar to preamplifier 11 described above and employing similar electronic switching means.

Thus, the four hookups represented schematically by FIGS. 25–28 may be appropriately inserted into the previously mentioned proper functional block diagrams.

FIG. 25 depicts the hookup most useful for achieving objects requiring a normal output signal train and a second signal train which is in precise synchronism but delayed by a certain interval of time, such as a $\frac{1}{60}$ second, relative to the normal train. Examples of such uses include dropout elimination and codified-interval duty cycle extension, as in field sequential color reproduction. This hookup is also desirable for multi-channel reproduction during stop motion scanning.

Figure 1:
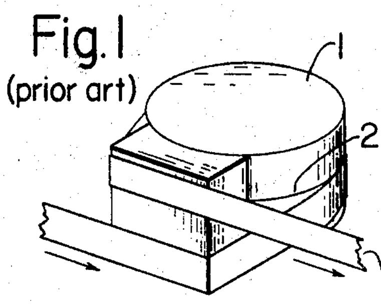
Fig. 1 (prior art)
Figure 2:
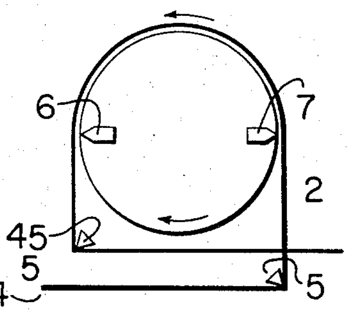
Fig. 2 (prior art)
Figure 5:
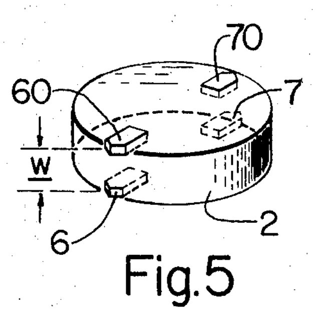
Figure 3:
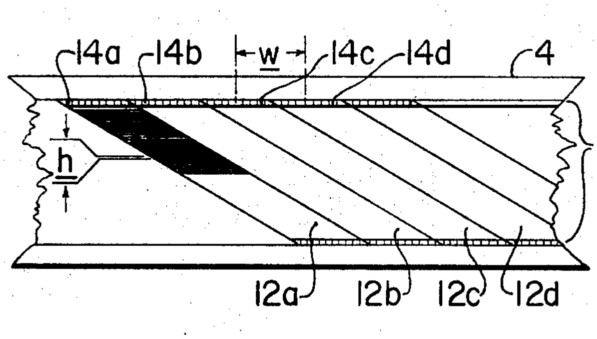
Fig. 3 (prior art)
Figure 6:
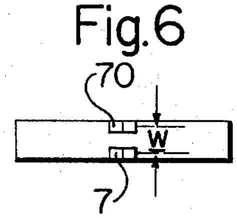
Figures 4, 7, 8:
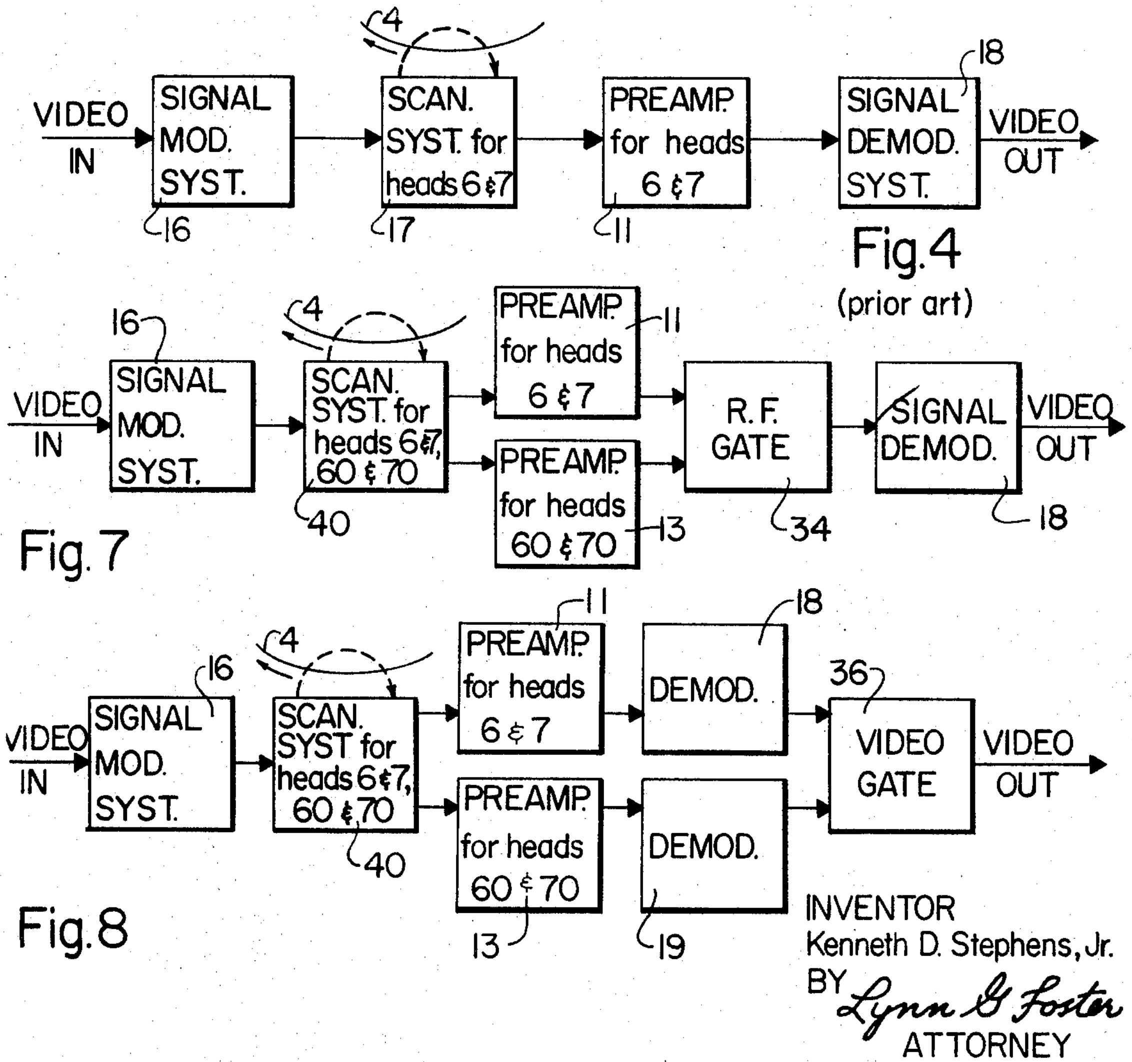
Fig. 4 (prior art), Fig. 7, Fig. 8
Figure 9:
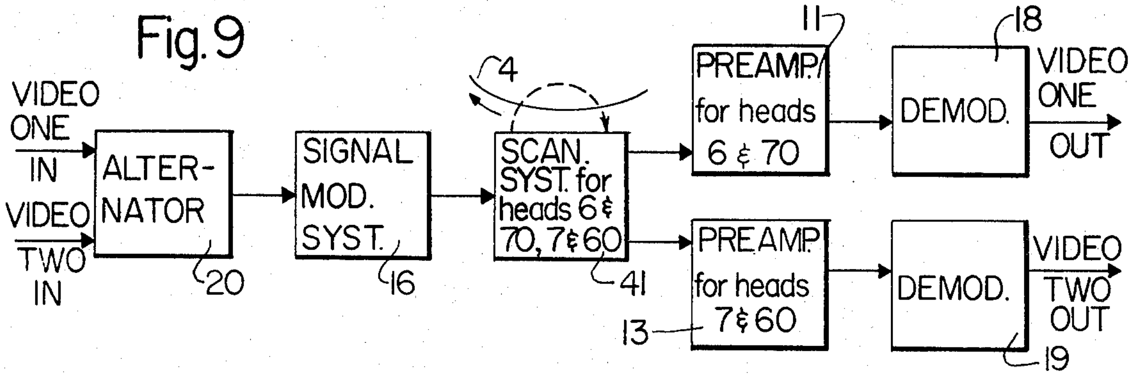
Figure 10:
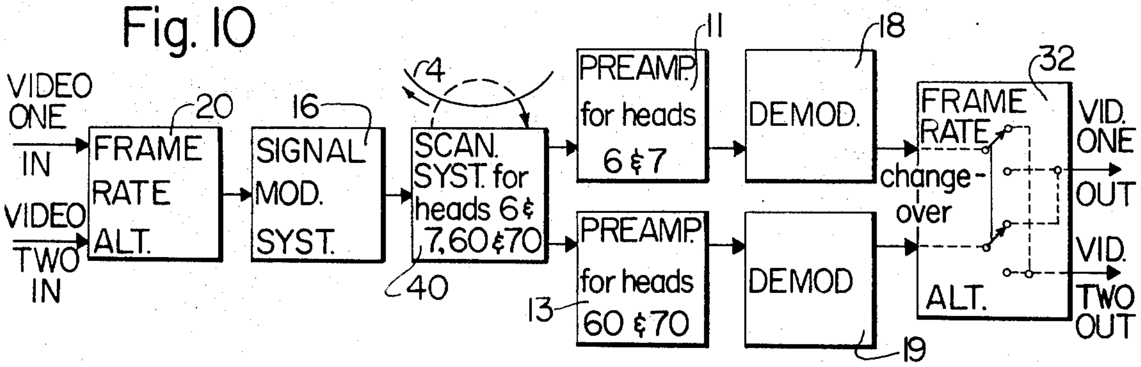
Figures 11, 12, 13, 14:
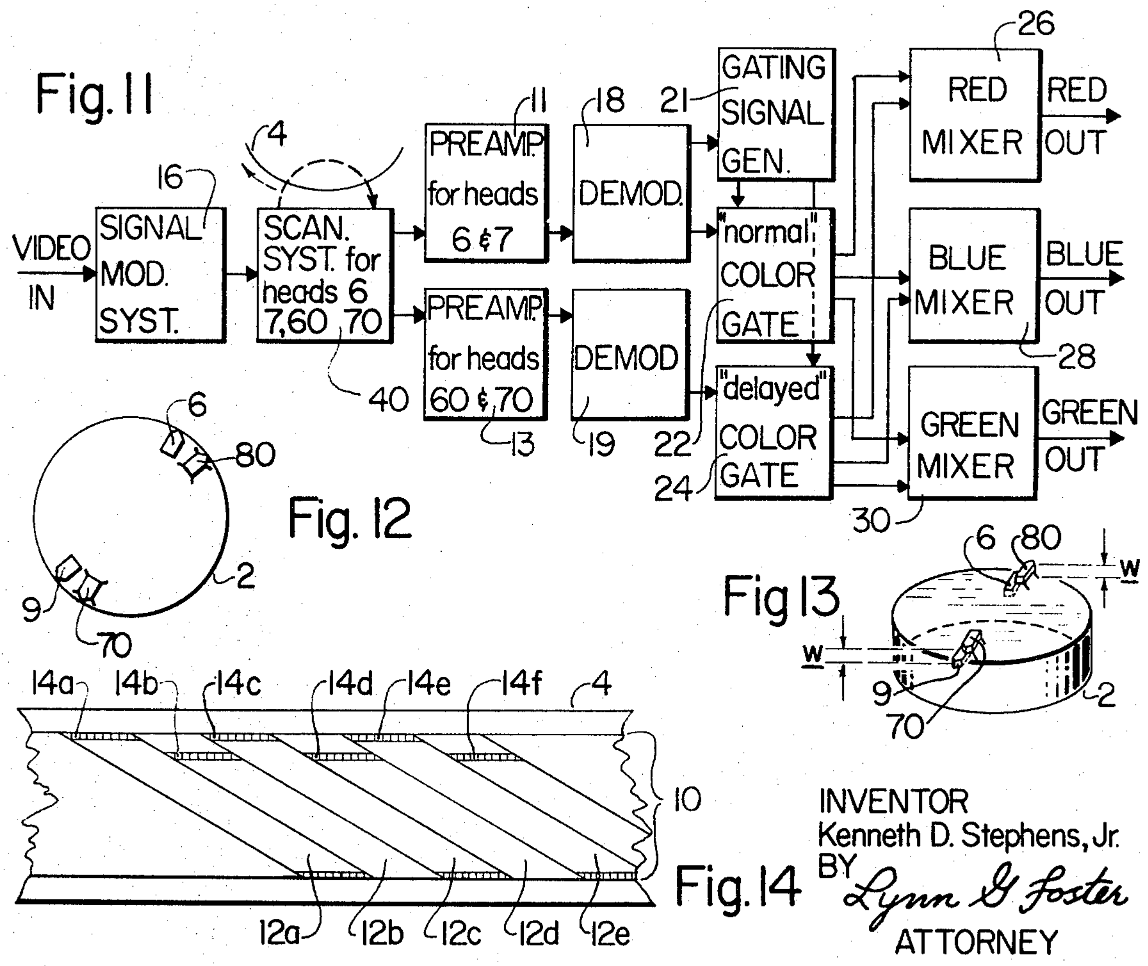
Figure 15:
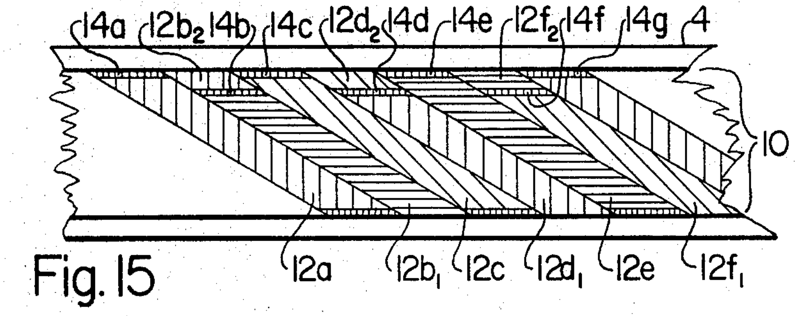
Figure 16:
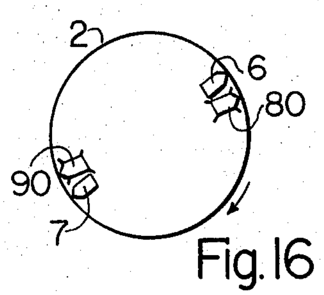
Figure 17:
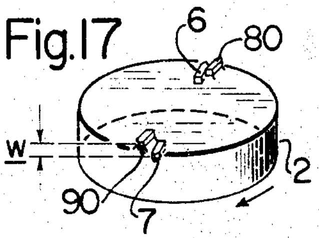
Figure 18:
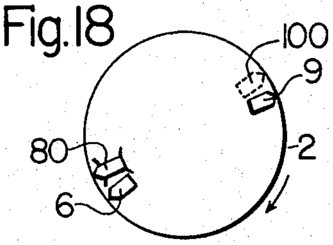
Figure 19:
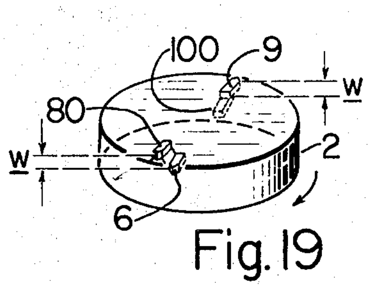
Figure 20:
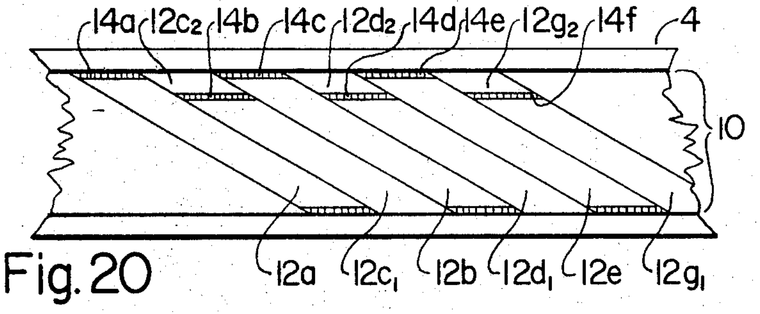
Figure 21:
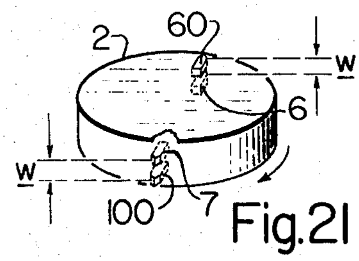
Figures 22, 23, 24:
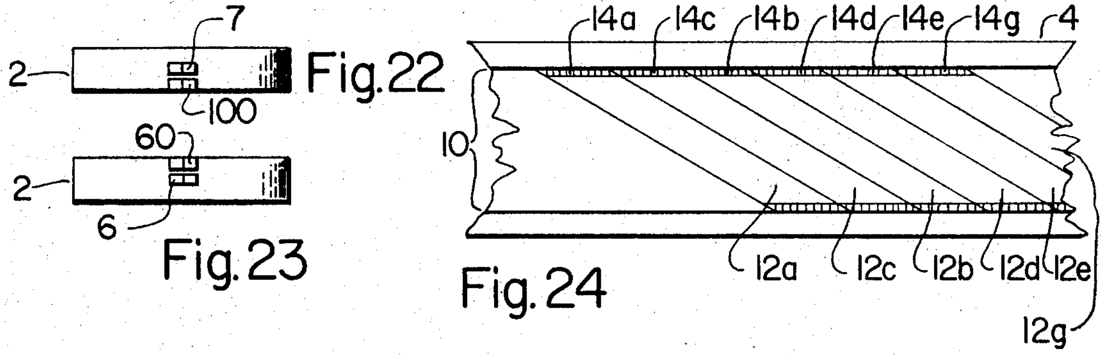
Figures 25, 26, 27, 28:
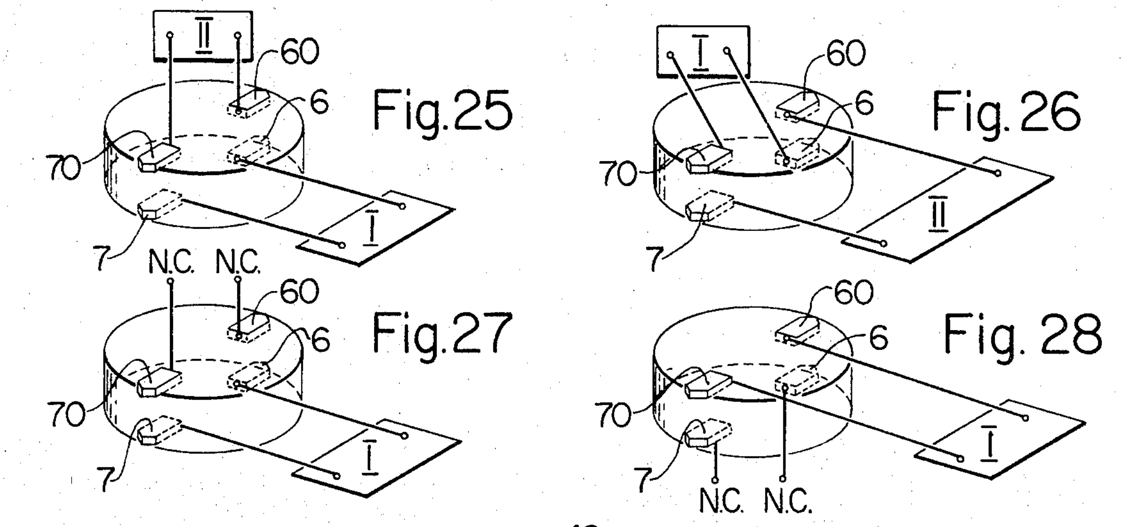
FIG. 26 represents one useful hookup for multi-channel programming during normal running operation. The head pairs are coupled such as to be concerned only with alternate tracks with the tracks containing information from separate input sources as earlier explained.
FIG. 27 depicts a hookup interchangeable with conventional recorders, which hookup can be used advantageously during most of the recording modes described herein.
FIG. 28 depicts an alternate hookup likewise interchangeable with conventional recorders, and similar to FIG. 27 although $\frac{1}{60}$ second delayed, which is available for conventional playback application in the event of normal channel head clogging, etc.
Figure 29:
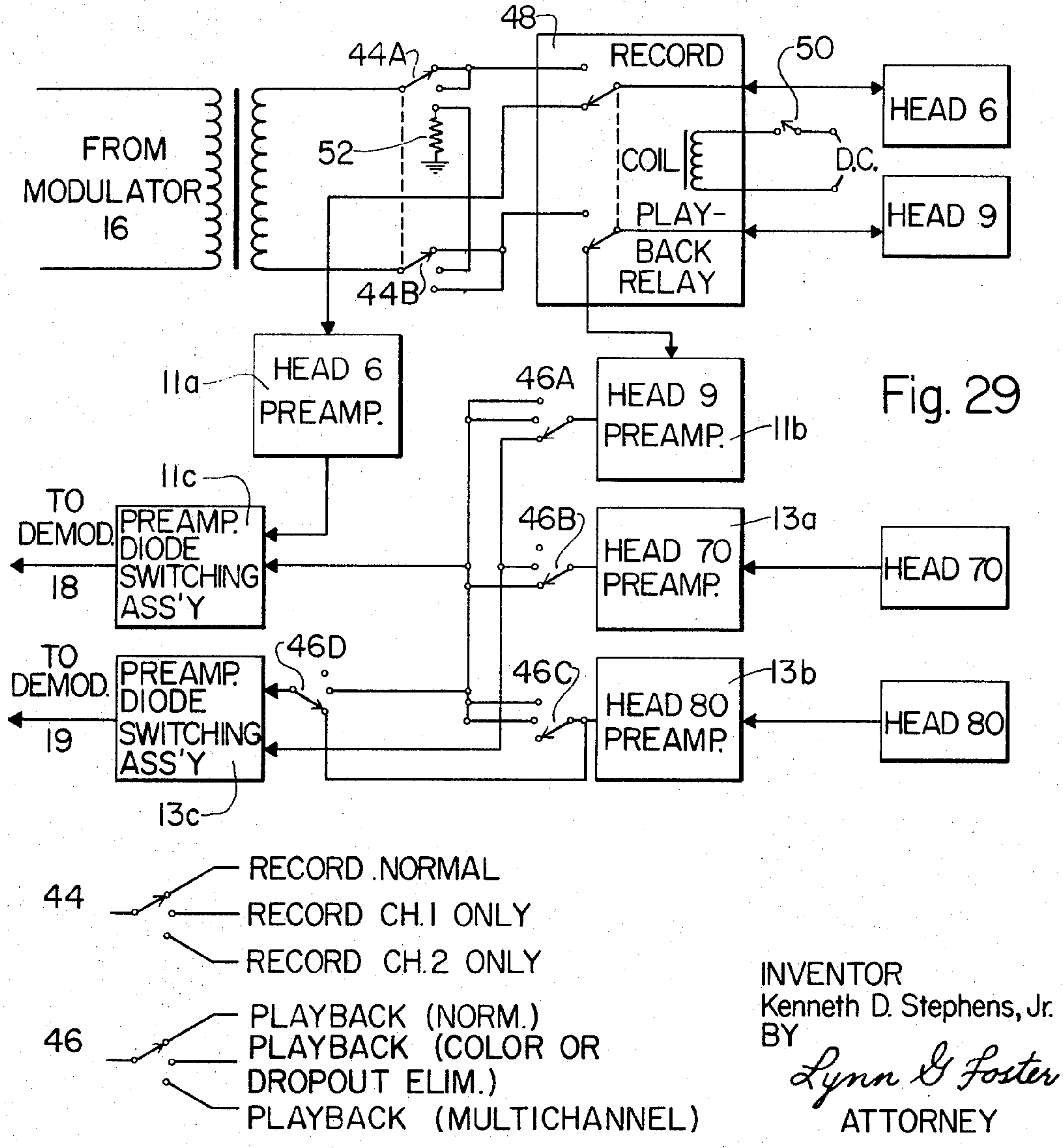

FIG. 29 depicts in block form one presently preferred head hook-up switching arrangement which is adapted for use in conjunction with the configuration represented in FIGS. 12 and 13 and applied to one conventional recorder. Existing within this recorder is a record/ playback relay 48 which is activated by an existing joystick "operational mode" control 50 which passes a D.C. voltage to the mentioned relay coil in the conventional "record" Mode. This relay 48, when activated in this manner, connects each of the heads 6 and 9 to certain positions on an added "record mode" switch 44 at 44*a* and 44*b*, which selects between normal and multi-channel (Source One only or Source Two only) operation. The latter two positions pertain to the non-simultaneous recordings of two or more channels on the magnetic tape medium. In either of these latter positions, switch 44 substitutes a resistor 52, having resistance of substantially equal value, for one or the other head to render said head impotent. The normal mode of operation pertains to the recording of field sequential color and simultaneous dual programming as well as to conventional and dropout-free signal trains.

When relay 49 is in the non-activated state, it connects each of the heads 6 and 9 to separate inputs to preamplifier components 11*a* and 11*b* of the normal preamplifier 11. Between the individual inputs of preamplifiers 11 and the diode switching assembly 11*c* at its output, there is placed a section of a second added switch 46. Other sections of this switch 46 intervene between similar inputs to preamplifier components 13*a* and 13*b* of an additional preamplifier 13 and a diode switching assembly 13*c* at its output. This second switch 46 selects between normal playback, color or dropout-free reproduction, and playback of one or more multi-programmed channels simultaneously, allowing operator selection among various hookups similar to those represented by FIGS. 25–28.

It is to be appreciated that in the foregoing embodiments the recorded pattern can be obtained either with an even number of heads with the tape traversing essentially 180° of the scanning assembly or with half as many heads with the tape traversing essentially 360° of the scanning assembly, or further, with any recorder which produces adjacent tracks which information is in close correspondence, as are alternate video fields.

The on-tape-interval delay capabilities, as described in this specification, used to record in a repetitive manner periodic signals, as in helical scan video tape recorders, may be utilized by one of several methods of this invention to achieve advantages over the prior art. Paramount among these advantages is achievement of higher quality reproduced signals by: (a) duty cycle extension, for example to reproduce sequentially alternately recorded information, as in multi-channel programming and sequential color television and (b) elimination of random noise, dropouts and the like.

The invention may be embodied in other specific forms without departing from the spirit or essential characteristics thereof. The present embodiments are therefore, to be considered in all respects as illustrative and not restrictive, the scope of the invention being indicated by the appended claims rather than by the foregoing description, and all changes which come within the meaning and range of equivalency of the claims are therefore to be embraced therein.

What is claimed and desired to be secured by United States Letters Patent is:

1. A method of recording and playback on a video tape recorder, comprising the steps of
- recording with a first head successive tracks of video information on video tape,
- picking up video information from discrete ones of said recorded tracks of video information with said first head and a second head by scanning each of said discrete tracks first with one of said heads and then with the other of said heads to reproduce the information recorded on each discrete track a plurality of times in a predetermined time sequence, and
- simultaneously picking up alternate recorded tracks of video information with third and fourth heads by scanning each of said alternate tracks first with the third of said heads and then with the fourth of said heads to reproduce the information recorded on each alternate track a plurality of times in a predetermined time sequence.

2. A method of duty cycle extension in the playback of video information recorded as a series of discrete successive tracks comprising
- positioning video head means adjacent each successive track and sequentially scanning each entire track at least two times, said video head means including four magnetic reproducing heads spaced to coincide with respective tracks, each of the discrete tracks being scanned by one head a predetermined period of time after a second of said heads respectively scans each of the same discrete tracks, and each of alternate tracks being scanned by a third of said heads a predetermined period of time after a fourth head respectively scans each of the same alternate tracks.

3. A method of recording and playback using a magnetic medium for enhancing the reproduction of color sequential signals including at least two discrete color representing signals comprising the steps of
- receiving said color sequential signals and sequentially recording each discrete color representing signal on successive tracks on a magnetic recording medium,
- playing back said recorded color representing signals in sequence, and
- repeating each recorded discrete color representing signal simultaneously with the playback of a succeeding discrete color representing signal.

4. A method as in claim 3 wherein
- said signals are recorded by a magnetic head assembly comprising a first pair of heads mounted in a first plane and spaced apart in said plane by a radial angle of approximately 180 degrees and said signals are played back by said first pair of heads and by a second pair of magnetic heads mounted in a second plane which is parallel to and spaced from said first plane by a distance $w-(\theta 180)w$, where $w$ is the spacing between tracks, and $\theta$ is the angle between the gaps of respective first and second heads of each pair, $\theta$ being greater than zero.

5. A method as in claim 3 wherein
- said signals are recorded by a magnetic head assembly comprising a first pair of heads mounted in a first plane and spaced apart in said plane by a radial angle of 180 degrees, and
- said signals are played back by said first pair of heads and by a second pair of magnetic heads mounted in a second plane which is parallel to and spaced from said first plane by a distance equal to an integer multiple of the recorded track width, gaps of the first heads of each pair and of the second heads of each pair being respectively aligned.

6. A method as in claim 3 wherein
- said color representing signals represent three primary color images.

7. A method as in claim 6 wherein
- said playback sequence is overlapped by playing back a next discrete recorded color representing signal while a given discrete recorded color representing signal is being repeated.

8. Magnetic recording apparatus for recording and reproducing color sequential video signals wherein magnetic transducer means is employed to record said signals on a magnetic recording medium with said signals comprising sequentially occurring information of at least two color types recorded as discrete tracks on said medium, the improvement comprising
- reproducing means for reproducing said recorded signals from said recording medium and providing the signals to an output, said signals applied to said output for each color type being in time a sequence of a color type and a repeat of the color type simultaneously with the reproduction of another color type, said reproducing means including a plurality of magnetic transducers of at least twice the number used for recording said signals on said recording medium.

9. Magnetic recording apparatus for recording and reproducing color sequential video signals wherein magnetic transducer means is employed to record said signals on a magnetic recording medium with said signals comprising sequentially occurring information of at least first and second color types recorded as discrete tracks on said medium, the improvement comprising reproducing means for reproducing said recorded signals from said recording medium and providing the signals to an output, said signals being applied to said output in a repetitive sequence of (a) a reproduction of a first color type, (b) a repeat of said first color type and a simultaneous reproduction of a second color type, and (c) a repeat of said second color type, said reproducing means including a plurality of magnetic transducers of at least twice the number used for recording said signals on said recording medium.

10. Apparatus as in claim 9 wherein said apparatus includes four transducers, a first pair of said transducers being used for recording said sequential color signals, and said four transducers being used for reproducing said sequential color signals, said color signals comprising first, second and third color signals recorded sequentially on said recording medium, and said reproduction of said signals occurring in a time sequence wherein each color signal is reproduced and then repeated when the next succeeding color signal is reproduced.

11. Apparatus as in claim 10 wherein said first, second and third color signals are respectively red, blue and green color signals.

12. Apparatus as in claim 10 wherein each of said color signals comprises a video information frame composed of even and odd video fields, said signals being recorded by said first pair of transducers in the following repetitive sequence, a first of said pair of transducers records a red even field, the second of said pair records a blue odd field, the first of said pair records a green even field, the second of said pair records a red odd field, the first of said pair records a blue even field, and the second of said pair records a green odd field.

13. Apparatus for recording and reproducing video information through the use of a magnetic recording medium comprising a first pair of magnetic transducers for respectively recording alternate tracks on said medium, said first transducers being mounted in a first plane, a second pair of magnetic transducers, said first and second pair of magnetic transducers serving to simultaneously retrieve separately useful information recorded by said first pair of transducers, the information retrieved by said second pair of transducers being substantially one track removed from the information retrieved by said first pair of transducers and said second pair being mounted in at lease another plane spaced from said first plane by a distance equal to $$w-(\theta/180)w$$

where $w$ is an integer multiple of the spacing between recorded tracks on said medium, and $\theta$ is the horizontal angular displacement between the first transducers of each pair of transducers in degrees and is from zero to a greater number but substantially less than 180, means for mounting said pairs of transducers in a fixed relationship with respect to each other, and means for imparting a predetermined relative motion between said transducers and said recording medium.

14. Apparatus as in claim 13 wherein $w$ is one times the center-to-center spacing between adjacent recorded tracks.

15. Apparatus as in claim 13 wherein the transducers of said second pair of transducers are mounted in a single plane.

16. Apparatus as in claim 15 wherein $\theta$ is equal to 0 and said distance is $w$.

17. Apparatus as in claim 13 wherein the transducers of said second pair of transducers are mounted in two planes, the second plane being above and the third plane being below said first plane by said distance equal to $w-(\theta/180)w$.

18. Apparatus as in claim 17 wherein $\theta$ is equal to 0 and said distance is $w$.

19. Apparatus as in claim 12 wherein $w$ is two times the center-to-center spacing between adjacent recorded tracks.

20. Apparatus as in claim 19 wherein alternator means are coupled to said first pair of magnetic transducers for receiving input video information from first and second sources and alternately supplying said information to said first pair of magnetic transducers, and second alternator means are coupled with said first and second pairs of magnetic transducers for supplying video information outputs respectively corresponding to the recorded information of said first and second sources, each out put including playback and a repeat playback of each recorded track for each source of information.

21. Apparatus for recording video information from plural sources on a recording medium and reproducing said information comprising alternator means for receiving video information from said plural sources and alternately providing output signals from said sources, a first group of magnetic transducers coupled with said alternator means to alternately record as discrete tracks on said recording medium said output signals supplied by said alternator means, and a second group of magnetic transducers, said transducers of said first and second groups serving to play back information recorded on said recording medium, first transducers of each group of transducers playing back information recorded from a first of said sources, and second transducers of each group of transducers playing back information recorded from a second of said sources.

22. Apparatus as in claim 21 wherein said first and second groups of transducers comprise first and second pairs of transducers mounted in separate planes spaced apart a distance equal to the track spacing of adjacent tracks of said recording medium, the first transducer of the first pair records alternate tracks of video information from a first of said plural sources, and the second transducer of the first pair records interleaved tracks of video information from a second of said plural sources, and the first transducer of the first pair plays back said alternate tracks and the first transducer of the second pair repeats the playback of said alternate tracks after playback by said first transducer of the first pair, and the second transducer of the first pair plays back said interleaved tracks and the second transducer of the second pair repeats the playback of said interleaved tracks after playback by said second transducer of said first pair.

23. Apparatus as in claim 21 wherein said first and second groups of transducers comprise first and second pairs of transducers mounted in separate planes spaced apart a distance equal to two times the track spacing of adjacent tracks of said recording medium, the first transducers of the first pair records alternate tracks of video information alternately from the first and second of said plural sources, and the second transducer of the first pair records interleaved tracks of video information alternately from the first and second of said plural sources, and the first and second transducers of the first pair respectively playback said alternate and interleaved tracks for respectively reproducing video signals from each of said sources, and the first and second transducers of the second pair repeat the playback of said alternate and interleaved tracks respectively for each source of video information to provide a separate playback and repeat thereof of the information recorded from each of said sources, the repeat of playback for one source occurring simultaneous with the original playback for another source.

24. Apparatus as in claim 21 wherein said plural sources comprise two sources and said alternator means alternately provide output signals from first one source and then another source, said first and second groups of magnetic transducers each comprise a pair of transducers, the transducers of the first pair being mounted in a first plane and the transducers of the second pair being mounted in a second plane spaced from said first plane an integer multiple of the spacing between recorded tracks on said recording medium, the first transducer of the first pair recording alternate tracks on said recording medium and the second transducer of said first pair recording interleaved tracks on said recording medium, and one of said transducers of said first pair playing back odd numbered tracks and one of the transducers of the second pair repeating the playback of said odd numbered tracks, and another of the transducers of the first pair playing back even numbered tracks and another transducer of the second pair repeating playback of said even tracks.

25. Apparatus as in claim 21 wherein said plural sources comprise two sources and said alternator means alternately provide output signals from first one source and then another source, said first and second groups of magnetic transducers each comprise a pair of transducers, the transducers of the first pair being mounted in a first plane and the transducers of the second pair being mounted in a second plane which is spaced from the first plane two times the spacing between adjacent recorded tracks on said recording medium, the first transducer of the first pair records odd numbered tracks alternately from said first and second sources, and the second transducer of said first pair records even tracks alternately from said first and second sources, and recorded signals from each of said sources is played back first by said first pair of transducers and then repeated by said second pair of transducers, the repeat by said second pair of transducers for information from one source occurring during playback of information by said first pair of transducers for the other source.

26. Apparatus as in claim 25 wherein second alternator means are coupled with said first and second pairs of transducers for alternately providing output signals recorded from said second sources.

27. Apparatus for recording units of video information occurring at a predetermined rate from plural sources on a recording medium and reproducing said information comprising alternator means for receiving video information from said plural sources and alternately providing output signals at said rate from first one source and then a second source, A plurality of magnetic transducers for recording information on, and reproducing information from said recording medium, first and second of said transducers being coupled with said alternator means to alternately record on said recording medium said output signals supplied by said alternator means as discrete odd and even tracks, said first and second transducers, and third and fourth transducers being mounted with respect to each other and with respect to said recording medium for reproducing information recorded on said recording medium, a first pair of said transducers respectively playing back odd and even tracks, and a second pair of said four transducers repeating playback respectively of said odd and even tracks, and output means coupled with said four transducers to provide separate outputs corresponding respectively to the information recorded from said first and second sources.

28. Apparatus as in claim 27 wherein said first transducer reproduces said odd tracks and said third transducer repeats said odd tracks after reproduction by said first transducer, said second transducer reproduces said even tracks and said fourth transducer repeats said even tracks after reproduction by said second transducer, and said first and second transducers are mounted in a first plane and said third and fourth transducers are mounted in a second plane parallel to said first plane spaced apart a distance equal to the spacing between adjacent tracks, and said first and fourth transducers have a coincident line of gap centers, and said second and third transducers have a coincident line of gap centers.

29. Apparatus as in claim 27 wherein said first transducer plays back odd tracks, and said fourth transducer repeats said odd tracks, and said second transducer plays back even tracks and said third transducer repeats said even tracks.

said first and second transducers being mounted in a first plane and said third and fourth transducers being mounted in a second plane parallel to said first plane spaced apart a distance equal to two times the spacing between adjacent tracks, and said first and third transducers have a coincident line of gap centers, and said second and fourth transducers have a coincident line of gap centers.

30. An apparatus for recording and reproducing periodic signals comprising movable recording means fed by said signals so as to develop a magnetic field with a direct relationship to said signals, a movable recording medium for receiving magnetic impressions developed by the recording means, said magnetic impressions being in the form of a plurality of essentially parallel tracks.

means for accepting information from at least two signal sources and for alternating said information so as to form a certain geometric relationship on the recording medium, a plurality of reproducing means adapted so that at least two are at all times scanning said impressions to thereby develop output signals, said reproducing means each having an effective width substantially equal to the width of one said track and one head means being positioned in complementary relationship with another head means substantially one track width apart vertically such that when one head means scans one track, another head means scans an adjacent track at substantially the same interval of repetition, whereby the output signals developed by the head means are in substantial synchronism, means creating separate outputs so as to form at least two separate signal trains during playback, each said train serially comprising first one interval of information and then a second interval of the same information, said signal means comprising information from separate ones of said signal sources, and means to process said signal trains to thereby recover substantially all of the original information contained in said signal sources, said process signal trains comprising separate and simultaneous multichannel programming.

31. Apparatus as in claim 30 wherein said signal sources and resultant separate signal trains are three in number.

32. An apparatus for recording and reproducing periodic signals comprising movable recording means fed by said signals so as to develop a magnetic field with a direct relationship to said signals a movable recording medium for receiving magnetic impressions developed by the recording means, said magnetic impressions being in the form of a plurality of essentially parallel tracks, a plurality of reproducing means adapted so that at least two are at all times scanning said impressions to thereby develop output signal trains, said reproducing means each having an effective width substantially equal to the width of one of said track and one head means being positioned in complementary relationship with another head means substantially one track width apart vertically such that when one head means scans one track, another head means scans an adjacent track at substantially the same interval of repetition, whereby the separate output signal trains developed by the head means are in substantially perfect synchronism and are separated during recording one from another by an interval of time, means to process each of said signal trains to recover one train exactly corresponding to the original recorded information, and to recover a second train substantially identical to the first recovery, but delayed by an interval of time, and means for gating said signal trains to discriminate between intervals of different color video fields and for directing said intervals into separate mixers, said mixers cumulatively adding said intervals in timed relation with their delayed counterpart intervals to thereby extend the duty cycle of each such interval.

References Cited

UNITED STATES PATENTS

| | | | |
|---|---|---|---|
| 2,856,462 | 10/1958 | Lyon | 179—100.2 |
| 2,856,463 | 10/1958 | Lyon | 179—100.2 |
| 3,157,739 | 11/1964 | Okamura | 178—6.6 |
| 3,267,207 | 8/1966 | Okazaki et al. | 178—6.6 |
| 3,152,223 | 10/1964 | Wessels | 178—6.6 |
| 3,213,204 | 10/1965 | Okamura | 179—100.2 |
| 3,359,365 | 12/1967 | Kihara | 178—6.6 |
| 3,470,315 | 9/1969 | Kihara | 178—6.6 |
| 3,470,316 | 9/1969 | Kihara | 178—6.6 |

BERNARD KONICK, Primary Examiner

R. S. TUPPER, Assistant Examiner

U.S. Cl. X.R.

178—6.6; 179—100.2